United States Patent
Anand et al.

(10) Patent No.: US 7,945,875 B2
(45) Date of Patent: May 17, 2011

(54) METHODOLOGY FOR HIERARCHY SEPARATION AT ASYNCHRONOUS CLOCK DOMAIN BOUNDARIES FOR MULTI-VOLTAGE OPTIMIZATION USING DESIGN COMPILER

(75) Inventors: Alok Anand, Bangalore (IN); Sajish Sajayan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 487 days.

(21) Appl. No.: 12/137,835

(22) Filed: Jun. 12, 2008

(65) Prior Publication Data

US 2008/0313580 A1    Dec. 18, 2008

Related U.S. Application Data

(60) Provisional application No. 60/943,879, filed on Jun. 14, 2007.

(51) Int. Cl.
  *G06F 17/50* (2006.01)
  *G06F 9/45* (2006.01)
  *G01R 31/28* (2006.01)
(52) U.S. Cl. ........ 716/103; 716/104; 716/106; 716/109; 716/120; 716/127; 716/133; 716/137; 714/726; 714/727; 714/729
(58) Field of Classification Search .................. 716/104, 716/106, 109, 120, 127, 133, 136; 714/726, 714/727, 729
See application file for complete search history.

(56) References Cited

U.S. PATENT DOCUMENTS

| 5,418,825 | A  | * | 5/1995  | Cantrell et al. ............... 377/48 |
|-----------|----|---|---------|---------------------------------------|
| 6,327,207 | B1 | * | 12/2001 | Sluiter et al. ................. 365/221 |
| 6,493,818 | B2 | * | 12/2002 | Robertson ...................... 712/27 |
| 6,536,024 | B1 | * | 3/2003  | Hathaway ..................... 327/295 |
| 6,598,191 | B1 | * | 7/2003  | Sharma et al. ................ 714/726 |
| 6,813,739 | B1 | * | 11/2004 | Grannis, III .................. 714/729 |
| 7,120,883 | B1 | * | 10/2006 | van Antwerpen et al. .... 716/102 |
| 7,266,743 | B2 | * | 9/2007  | Athavale et al. .............. 714/727 |
| 7,500,164 | B2 | * | 3/2009  | Chelstrom et al. ........... 714/729 |
| 7,669,165 | B2 | * | 2/2010  | Pandey et al. ................ 716/109 |
| 7,694,251 | B2 | * | 4/2010  | Chandramouli et al. ..... 716/106 |
| 7,735,030 | B1 | * | 6/2010  | Kalil et al. .................... 716/136 |
| 7,739,629 | B2 | * | 6/2010  | Wang et al. ................... 716/136 |
| 7,747,971 | B1 | * | 6/2010  | Chopra et al. ................ 716/136 |
| 2009/0083594 | A1 | * | 3/2009 | Chelstrom et al. ........... 714/727 |
| 2010/0017775 | A1 | * | 1/2010 | Kanno et al. .................... 716/16 |
| 2010/0064271 | A1 | * | 3/2010 | Chen .................................. 716/5 |

* cited by examiner

*Primary Examiner* — Helen Rossoshek
(74) *Attorney, Agent, or Firm* — Robert D. Marshall, Jr.; W. James Brady; Frederick J. Telecky, Jr.

(57) ABSTRACT

This invention transforms a circuit design at an asynchronous clock boundary using a flow involving register grouping, logic modification and level shifter and isolation cell insertion. The level shifter and isolation cell inserted are tested for proper location. The transformed circuit design is suitable for power consumption control by independent control of separate voltage domains.

8 Claims, 7 Drawing Sheets

METHODOLOGY FOR HIERARCHY SEPARATION AT ASYNCHRONOUS CLOCK DOMAIN BOUNDARIES FOR MULTI-VOLTAGE OPTIMIZATION USING DESIGN COMPILER

CLAIM OF PRIORITY

This application claims priority under 35 U.S.C. 119(e)(1) to U.S. Provisional Application No. 60/943,879 filed Jun. 14, 2007.

TECHNICAL FIELD OF THE INVENTION

The technical field of this invention is logical hierarchy partitioning of designs at asynchronous clock boundaries to enable aggressive power management.

BACKGROUND OF THE INVENTION

It is a widely used design practice to designing intellectual property (IP) electronic modules with multiple asynchronous clock domains. This practice permits designers to meet performance requirements of each clock domain independently. This also eases the timing closure problem because each clock domain can be treated independently for optimization, clock tree synthesis and timing closure.

Providing multiple asynchronous clock domains enables clock-gating each domain independently to save dynamic power. In peripheral IPs the core clock can be clock gated when there is no data to be exchanged with the external world. The input/output (IO) clock can be kept on to generate a core/CPU interrupt on detection of incoming packet data from the external world.

With shrinking process geometries, static/leakage power has become a major contributor to total power consumption. Such static power can be kept low by operating at a lower supply voltage. Since lowering the voltage reduces how fast the circuit can operate, it is important to operate the device at a supply voltage that is just enough to meet the performance requirements. This voltage gives the best power solution without compromising performance.

The asynchronous boundary inside the peripheral IP also provides an opportunity to save on leakage power by creating separate voltage domains for each of the asynchronous clock domains. Existing electronic design automation (EDA) tools require that each asynchronous clock domain must be enclosed by a distinct logical hierarchy, which subsequently becomes a voltage island. Each voltage island can then be separately optimized in operating voltage and frequency to meet the power and performance goals.

In many systems some of these voltage islands may be un-used for long periods of time. These voltage islands can be independently powered off using power switches on the chip to save on both leakage and dynamic power.

Designs with multiple asynchronous clock domains can be exploited to:
1. Meet performance requirements of each domain independently;
2. Save dynamic power by clock-gating each domain independently;
3. Save static power by supplying each domain in a voltage island an optimum supply voltage; and
4. Save power by shutting off power to a voltage island when not used.

Legacy IPs are typically designed to meet only the first design objective. Thus they may not have these asynchronous clock boundaries along logical hierarchies. To meet the other objectives, the circuit should be partitioned along the asynchronous clock domain boundaries and logical hierarchies should be created which then can be mapped to voltage islands.

SUMMARY OF THE INVENTION

This invention uses the capabilities of existing EDAs, such as Synopsys Design Compiler, to group logic pertaining to each clock domain into separate logic hierarchies. This invention does necessary logic cloning, level shifter and isolation cell insertion to completely isolate the timing paths to be within the respective hierarchies. The partition methodology involves: register grouping; inputs and clock gate grouping; and logic duplication. This invention is easily portable across any EDA synthesis tool and is scalable across process technologies.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
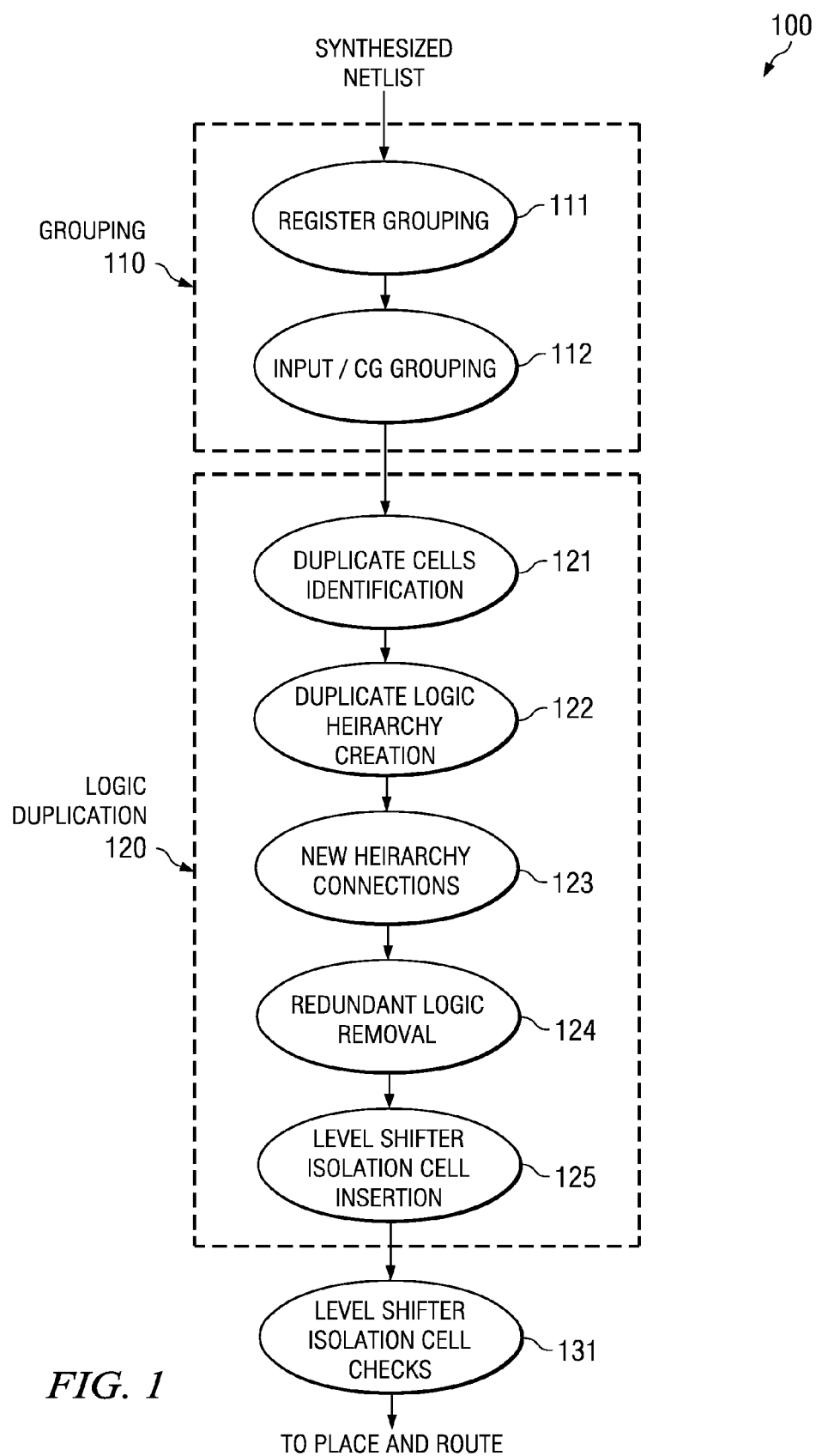
FIG. 1 is a flow chart illustrating the steps of this invention.

FIG. 1 illustrates the partition method 100 of this invention. Partition method 100 begins with an input of the synthesized netlist of the circuit. Partition method 100 includes grouping 110, logic duplication 120 and level shifter/isolation cell insertion 131. Grouping 110 includes register grouping 111 and input and clock gate grouping 112. Logic duplication 120 includes duplicate cells identification 121, duplicate logic hierarchy creation 122, new hierarchy connections 123, redundant logic removal 124 and level shifter isolation cell insertion 125. Each of these steps will be described in detail below.

Figure 2:
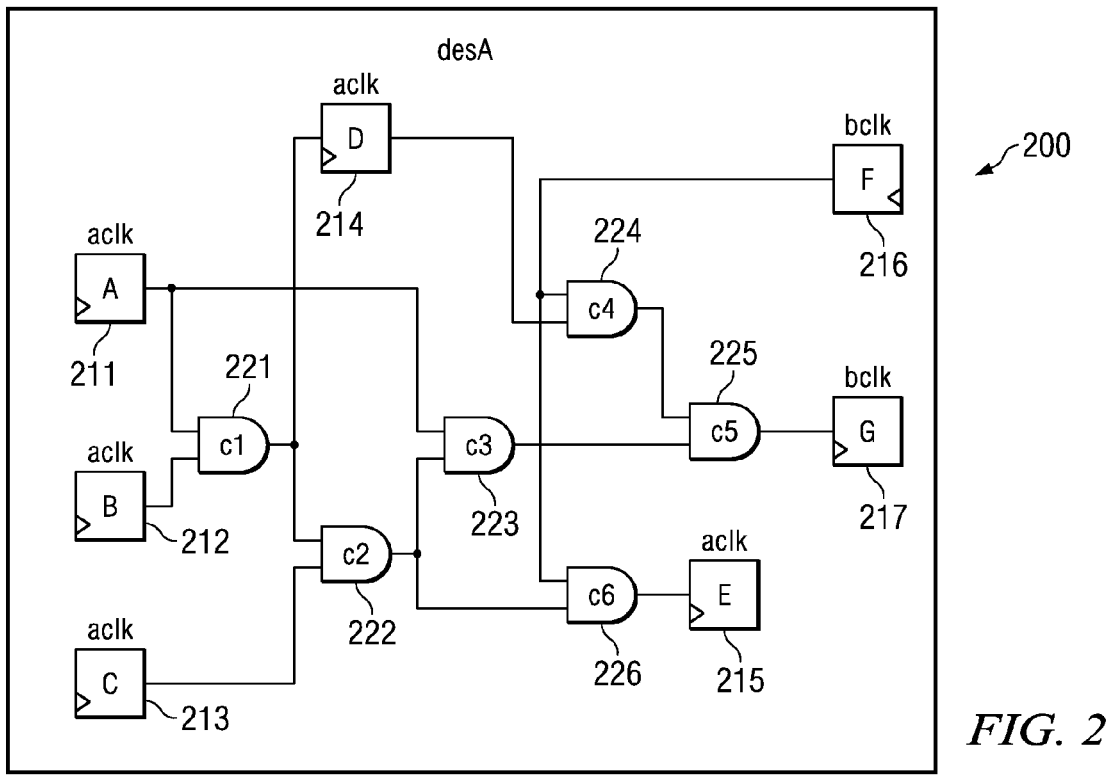
FIG. 2 illustrates an original circuit example used to explain the operation of this invention.

FIG. 2 illustrates an example circuit to which this invention is applicable. Design module desA 200 of FIG. 2 is a memory controller. Module desA 200 has two asynchronous clock domains: aclk and bclk. The clock domain aclk uses the core side interface clock. This is typically a clock ratio divided from the CPU clock. Clock domain bclk uses the memory interface clock.

This example makes the following assumptions. The core side voltage is $V_{DD}$. The IO side voltage is $V_{DD1}$. The IO side voltage is $V_{DD1}$ is switchable ON/OFF for power consumption control.

Module 200 includes flip-flops A 211, B 212, C 213, D 214 and E 215 clocked by the core side interface clock aclk. Module 200 includes flip-flops F 216 and G 217 clocked by the memory interface clock bclk. Module 200 includes combinatorial logic c1 221, c2 222, c3 223, c4 224 and c5 225.

The goal of partitioning desA module 200 and creating a logical hierarchy desA_aclk 280 (FIG. 8) for aclk is to enable advanced power consumption control. To meet this goal: all timing paths from aclk to aclk are contained only within desA_aclk hierarchy; all timing paths from aclk to bclk pass through desA_aclk hierarchy only once; and all timing paths from bclk to aclk pass through desA_aclk hierarchy only once.

Module desA 200 has no hierarchies which clearly isolate aclk and bclk domains. There are hierarchies which contain both aclk and bclk registers. Some combinational logic such as logic c1 221 to c5 225 are shared between synchronous logic paths (aclk to aclk, bclk to bclk) and asynchronous logic paths (aclk to bclk, bclk to aclk).

In the modified module 280 (FIG. 8) all aclk timing paths are totally enclosed within the desA_aclk hierarchy. All bclk timing paths are at the top level. Shared combinational logic such as c1 221 to c5 225 have been cloned to isolate the respective timing paths. The clock domain desA can be mapped to the $V_{DD1}$ voltage domain and the clock domain desA_aclk can be mapped to the $V_{DD}$ voltage domain. Level shifters are inserted for signals crossing from $V_{DD}$ to $V_{DD1}$ to translate the voltages and isolation cells from $V_{DD1}$ to $V_{DD}$. This ensures that when $V_{DD1}$ is turned OFF, the inputs to the $V_{DD}$ voltage domain are not left floating and that proper logic values are driven.

Returning to FIG. 1, register grouping 111 creates a logic hierarchy of all registers of a particular domain. Since the registers for each clock domain are not contained in a single hierarchy, the circuit design is first flattened. Registers along with fanin and fanout cones are grouped together and a new hierarchy desA_aclk is created.

Inputs and clock gates grouping 112 inputs of the newly created hierarchy desA_aclk. This hierarchy desA_aclk is inspected to see which inputs are at the module top level. For each of these inputs, the entire combinational cloud from the module input to the corresponding connection at the newly created hierarchy desA_aclk needs to be grouped into the aclk domain. All clock gates in the circuit which control aclk registers are also added to the desA_aclk hierarchy.

Figure 3:
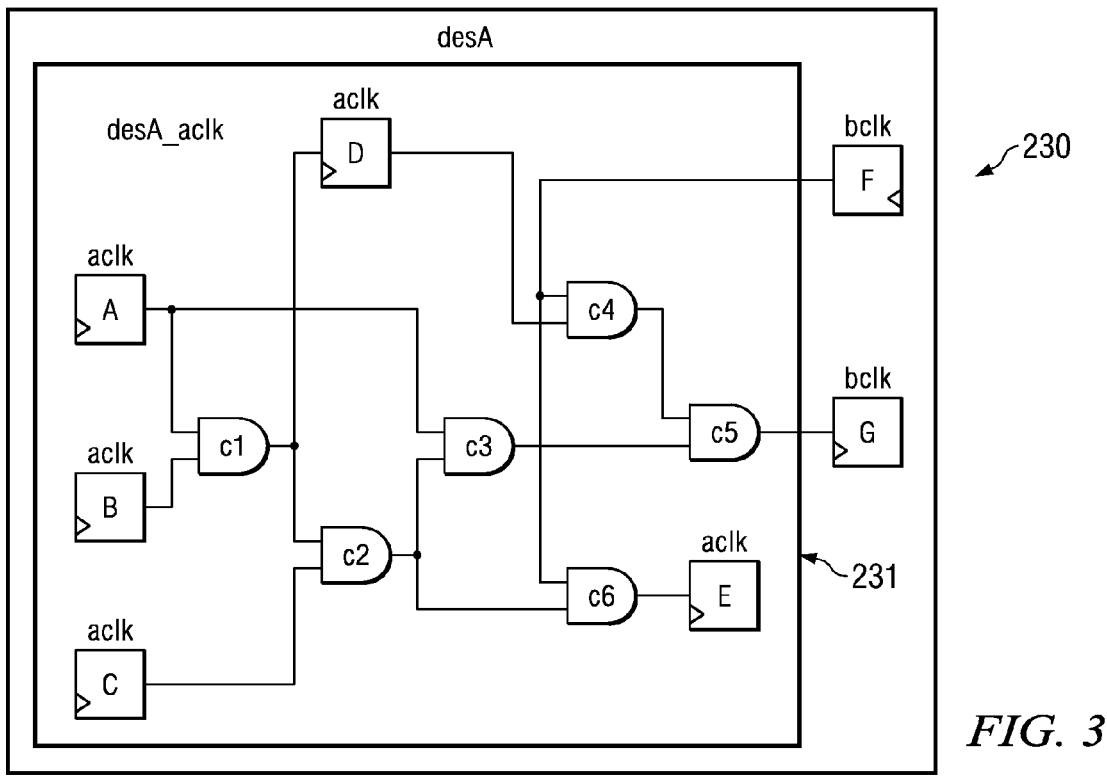
FIG. 3 illustrates an intermediate state of this invention following grouping.

FIG. 3 illustrates the intermediate state following grouping 110. Intermediate circuit 230 includes newly created hierarchy 231.

Logic duplication 120 follows grouping 110. Grouping 110 creates a new hierarchy desA_aclk 231 which comprises of all aclk registers and associated fanin and fanout combinational logic. From a timing perspective, all aclk to aclk timing paths such as A 211 to D 214, B 212 to E 215 and C 213 to E 215 illustrated in FIG. 2 are completely self-contained within the desA_aclk 231 hierarchy. The inputs to aclk timing paths are also completely within desA_aclk 231 hierarchy. Combinational logic on aclk to bclk paths such as B 212 to G 217 and C 213 to G 217 in FIG. 2 are also inside desA_aclk 231 hierarchy. Timing paths from bclk to bclk which do not feed into or receive inputs from aclk are at the top level only. They do not traverse through the desA_aclk 231 hierarchy. Paths from bclk to bclk such as F to G traverse through desA_aclk hierarchy since they either feed into or receive inputs from aclk registers. These cross the boundary of desA_aclk 231 while entering and leaving the hierarchy causing voltage domain crossings. Since these paths are synchronous, they should be avoided. This is done by duplicating logic in the bclk domain (top level) discussed below.

Logic duplication 120 includes the following steps: duplicate cell identification 121; duplicate logic hierarchy creation 122; connections to new hierarchy 123; redundant logic removal 124; and level shifter and isolation cell insertion 125.

Duplicate cell identification 121 involves a backward traversal from the outputs of desA_aclk 231 and recursively marks combinational cells on the path until all inputs of a combinational cell go back to aclk registers. The steps for accomplishing this are as follows. The method creates a list of all top level output ports of desA 200. The method changes the design level to desA_aclk 231. The method creates a collection $endpoints of all outputs at desA_aclk 231 hierarchy. The method filters out ports from this collection which are directly connected to top level output ports. For each $endpoint, the method gets the driving pin. The method checks what other pins are there in the fanout of the driving pin. If the driving pin is driving a top level output port, then the method stops processing that endpoint further. This filters out all outputs of desA_aclk 231 which are not driving a bclk register and hence need no duplication. The method gets the driving cell name for the driving pin and checks if the cell has processed user attribute set. This attribute is set later in the method. If the driving cell is a sequential cell (an aclk flip-flop), then the method stops processing at that endpoint. If the driving cell is a combinational cell, then the cell should be duplicated. The method appends the cell name to the list of duplicable cells. A new attribute PROCESSED is created on this cell. PROCESSED is set to true to indicate that this cell has been processed and marked for duplication and should not be processed again. This avoids large run-times for cells that exist in fanin cones of multiple output ports (endpoints). For this cell which is marked for duplication the logic duplication algorithm is run on each of its input pins.

Figure 4:
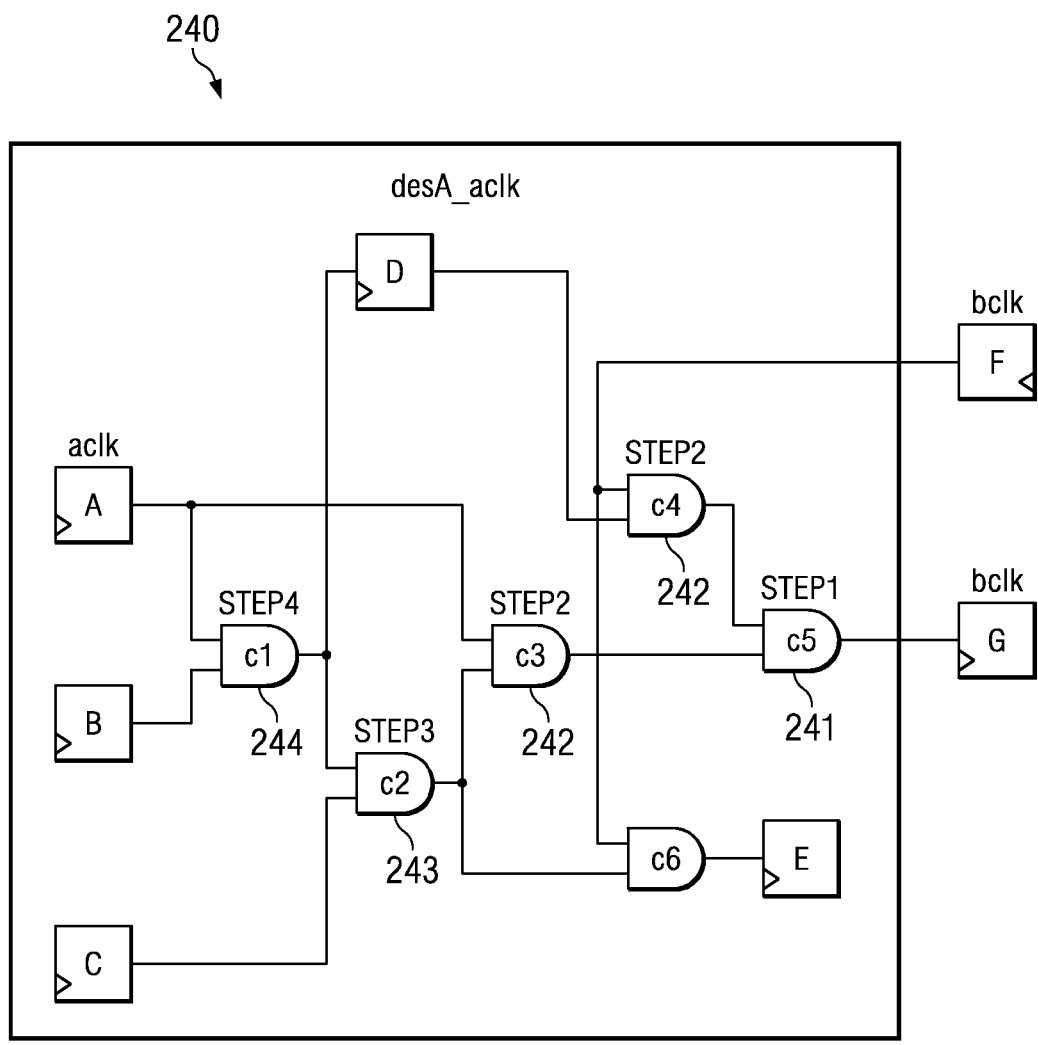
FIG. 4 illustrates an intermediate state of this invention following logic duplication.

FIG. 4 illustrates the steps in duplicate cell identification 121 of this example. Method 100 traverses backwards from output port of desA_aclk 231 and finds gate c5 225 (FIG. 1). Gate c5 225 is a combinational cell and not driving any top level output and hence c5 225 is marked for duplication. This is illustrated as step 1 241 in FIG. 4. The method next traverses backwards from the inputs of gate c5 225 and finds gates c3 223 and c4 224, which again being combinational cells are marked for duplication. This is step 2 242. The inputs of c4 224 are not parsed further since they are either driven by flip-flop D 214 or from primary port.

The inputs of c3 223 are traversed. This finds the combinational cell c2 222 and which is marked for duplication. The other input of c3 223 is driven by flip-flop A 211 and is thus ignored. This is also step 2 242 in FIG. 4.

The inputs of c2 222 inputs are traversed. This locates combinational cell c1 221 which is marked for duplication. The other input of c2 222 is driven by flip-flop C and is thus ignored. This is step 3 243 in FIG. 4.

The inputs of c1 221 are traversed. It is determined that these inputs are driven by respective flip-flops A 211 and B 212. This ends the recursive search for that particular output. This is marked as step 4 244.

Figure 5:
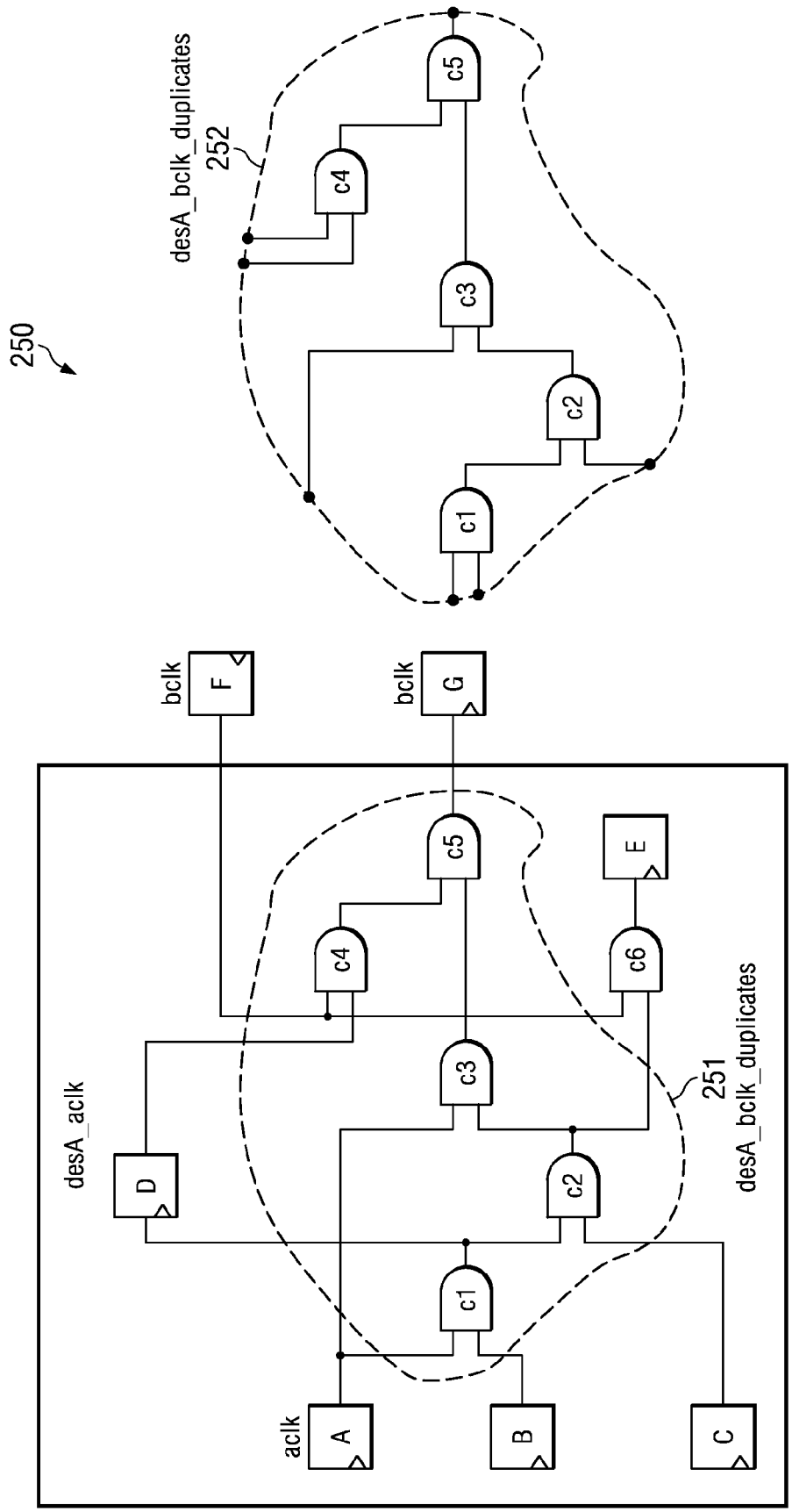
FIG. 5 illustrates an intermediate state of this invention following logic hierarchy creation.

Method 100 next duplicates the logic hierarchy creation in step 122. A new hierarchy desA_bclk_duplicates 251 (FIG. 5) is created within desA_aclk 231 containing the cells marked for duplication. At the top level, a new instance of these cells 252 is created with desA_bclk_duplicates as the reference name. Duplicates 252 contains all the cells that have been duplicated. The cells within the newly created hierarchy at top level are already connected to each other. Those pins of the cells that are driven by aclk flip-flops become the ports of the newly created hierarchy. The intermediate results are illustrated in FIG. 5.

Figure 6:
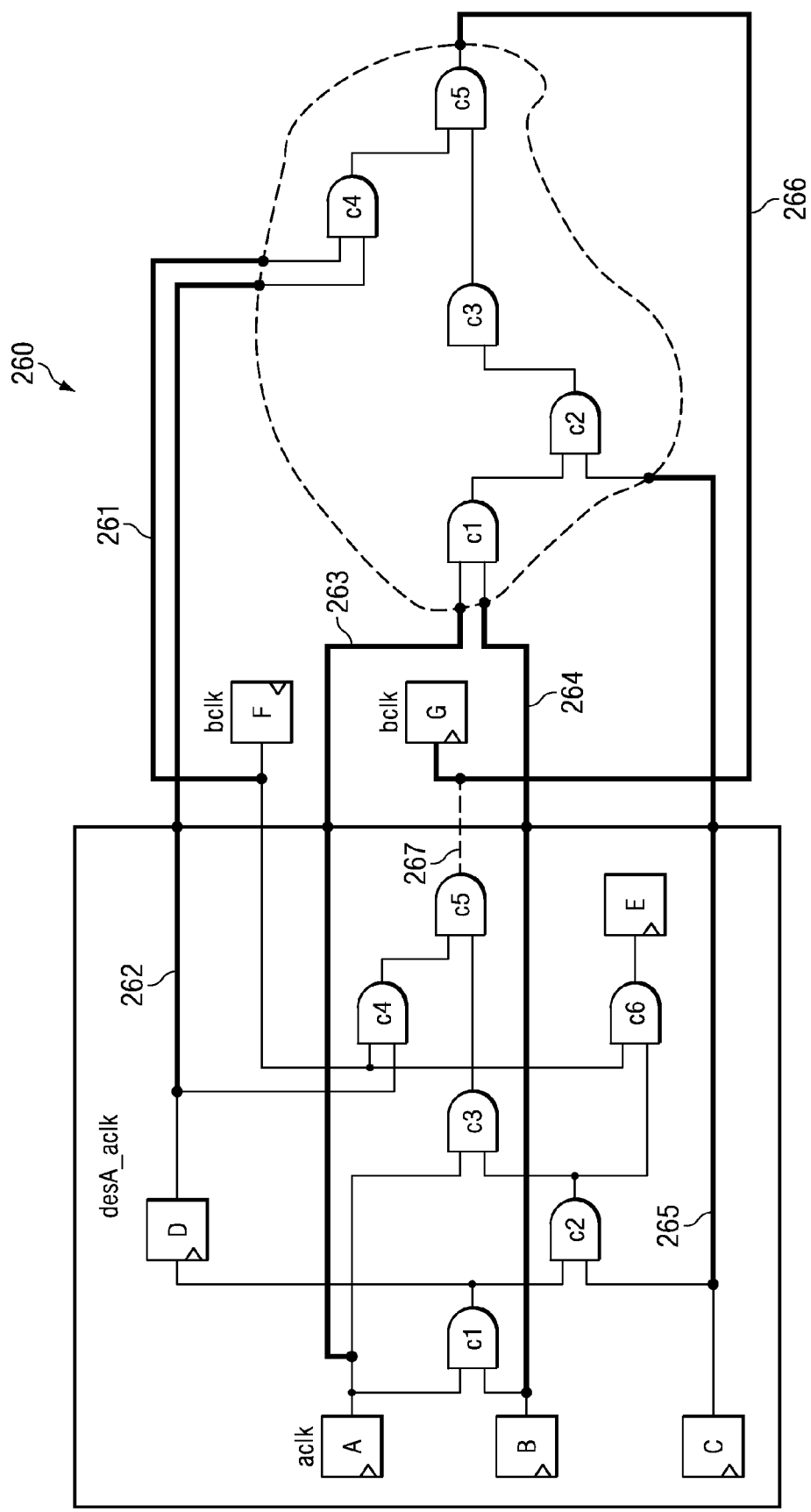
FIG. 6 illustrates an intermediate state of this invention following creation of new connections.

New hierarchy connections step 123 compares the ports of desA_aclk 231 and desA_bclk_duplicates 250 and prepares following lists. The list $new_hier_only_in_ports includes the input ports of desA_bclk_duplicates 252 which are not ports of desA_aclk 231. In this example, these ports are the inputs of c1 221, c2 222, c3 223 and c4 224. New ports are created for these inputs at the desA_aclk level and connections made. For these the net name will be same as the port name. Connections are made at the top level from each newly created ports of desA_aclk 231 to the corresponding port of desA_bclk_duplicates 252. The list $new_hier_comm_in_ports includes the input ports of desA_bclk_duplicates 251 which are ports of desA_aclk 231. Connections are made at the top level from each existing port of desA_aclk 231 to the corresponding port of desA_bclk_duplicates 252. The list $new_hier_comm_out_ports includes the output ports of desA_bclk_duplicates 252 which are output ports of desA_aclk 231. In our example, this is the output pin of c5 225. The output port from desA_aclk 231 is disconnected at top-level from the bclk flip-flop (dashed line 267 in FIG. 6) and connected to the corresponding output port of desA_bclk_duplicates. FIG. 6 illustrates lines 261, 262, 263, 264, 265 and 266 forming these new connections. The intermediate result is illustrated in FIG. 6.

Figure 7:
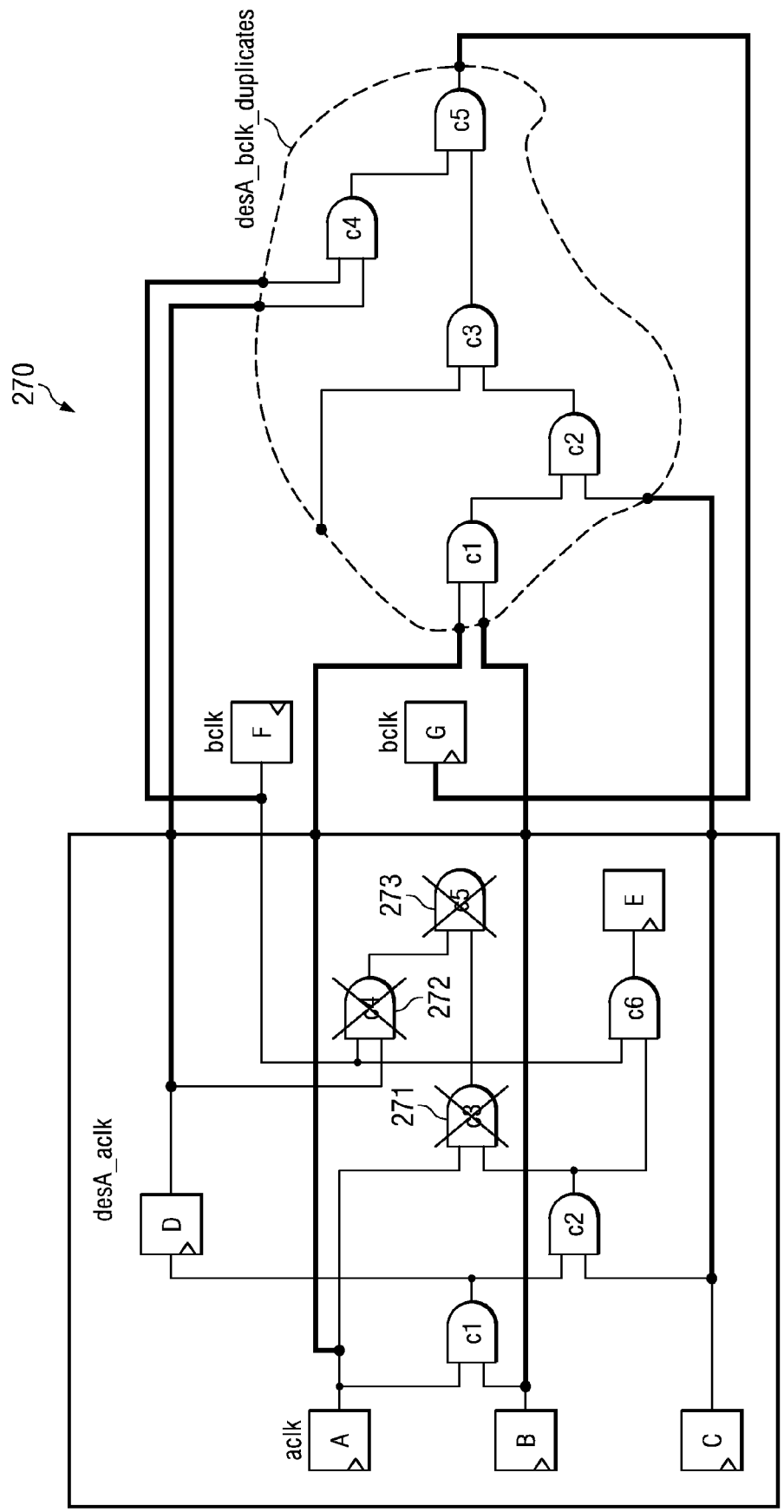
FIG. 7 illustrates an intermediate state of this invention following redundant logic removal.

Method 100 next implements redundant logic removal step 124. The output after the duplicate hierarchy creation step 123 is functionally equivalent to our final desired output. However, duplicate hierarchy creation step 123 has cloned logic gates from desA_aclk 231 to desA_bclk_duplicates 252 and in the process created several logic gates in desA_aclk which are redundant and can be optimized. A simple top down compile gets rid of unused logic yielding the final netlist which meets our initial partition goals. This is shown in FIG. 7. Note that gates c3 223, c4 224 and c5 225 are determined to be redundant and removed at respective deletions 271, 272 and 273.

Figure 8:
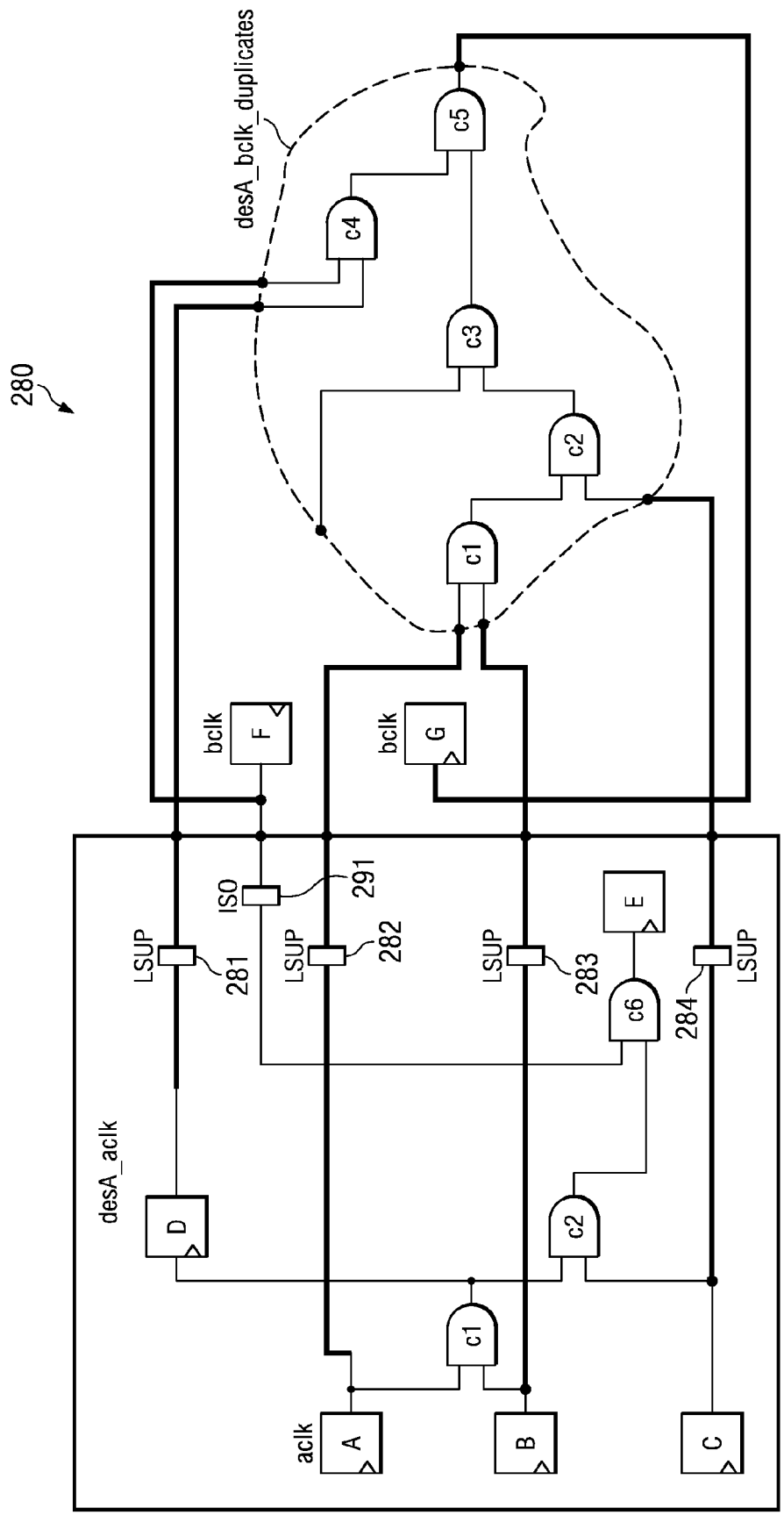
FIG. 8 illustrates an intermediate state of this invention following level shifter and isolation cell insertion.

Method 100 next performs level shifters and isolation cell insertion step 225. Following logic duplication step, the newly created hierarchy desA_aclk contains aclk logic and bclk logic. The bclk logic is wholly at the top level. Level shifter cells 281, 282, 283 and 284 are inserted at the interface of desA_aclk boundary for all outputs of desA_aclk driving into bclk domain. Isolation cells such as isolation cell 291 are inserted at the interface of desA_aclk boundary for all inputs of desA_aclk being driven from bclk domain. This is illustrated in FIG. 8.

Method 100 creates a new logical hierarchy desA_aclk which will be mapped to $V_{DD}$ voltage domain. The rest of the logic, which includes logic at top level and within desA_bclk_duplicates, will be mapped to $V_{DD1}$ voltage domain.

Level shifter and isolation cell insertion step 125 inserts level shifters and isolation cells at all crossings between these voltage domains. Level shifter and isolation cell checks step 131 validates the entire partition methodology. This employs two levels of checks.

Level shifter and isolation cell checks step 131 performs timing checks. The original goal was to create a partition desA_aclk such that: all timing paths from aclk to aclk are contained only within desA_aclk hierarchy; all timing paths from aclk to bclk pass through desA_aclk hierarchy only once; and all timing paths from bclk to aclk pass through desA_aclk hierarchy only once. These conditions are translated into the following checks. For all timing paths starting from aclk flip-flop and ending in aclk flip-flops, step 131 ensures that there are no level shifters along the path. For all timing paths starting from bclk flip-flops and ending in bclk flip-flops, step 131 ensures that there are no level shifters along the path. For all timing paths starting from aclk flip-flops and ending in bclk flip-flops, step 131 ensures that there is only one level shifter along the path. For all timing paths starting from bclk flip-flops and ending in aclk flip-flops, step 131 ensures that there is only one isolation cell along the path. These checks are performed by checking a comprehensive list of timing paths for each category for presence of the correct type of cell.

Level shifter and isolation cell checks step 131 also performs structural checks. Structural checks are preferably performed using a third party power management tool. Specified inputs to this tool include the domain definitions and association with hierarchies. For the $V_{DD}$ domain the hierarchy is desA_aclk. For the $V_{DD1}$ domain the hierarchy is the rest of desA. Specified inputs to this tool include the power management cell types including the level shifters and isolation cells. Specified inputs to this tool include the voltage values for domains and rail voltage values for level shifter/isolation cell input and output pins. The tool checks the structure of the netlist to see if all level shifters and isolation cells are inserted at the power crossings.

What is claimed is:

1. A computer implemented method for conversion of a synthesized netlist circuit design from a first form into a circuit design of a second form having separable frequency/voltage domains suitable for power consumption control comprising the steps of:
    grouping registers within the circuit design into hierarchies of a same frequency/voltage domain;
    grouping input and gated clocks within the circuit design including fanin and fanout combinational logic associated with a corresponding hierarchy of registers wherein all data paths between registers of a same hierarchy are within said same hierarchy;
    identifying cells for duplication in the circuit design, including
        backward traversal from the outputs of each frequency/voltage domain, and
        recursively marking combinational cells on the path until all inputs of a combinational cell go back to registers or inputs of same frequency/voltage domain;
    duplicating the identified cells by insertion of new cells corresponding to said cells identified for duplication, said new cells connected to each other corresponding to said cells identified for duplication thereby forming a new hierarchy;
    creating new connections within said new hierarchy;
    removing redundant logic elements; and
    inserting level shifters and isolation cells in circuit connections which cross boundaries between frequency/voltage domains; and wherein said steps of grouping registers, grouping input and gated clocks, identifying cells for duplication, duplicating the identified cells, creating new connections, removing redundant logic elements, and inserting level shifters and isolation cells are computer implemented.

2. The computer implemented method of claim 1, wherein:
    said step of grouping registers within the circuit design includes
        flattening the circuit design,
        creating a logic hierarchy of all registers of a particular frequency/voltage domain by grouping registers with the same fanin and fanout cones, and
        creating a new hierarchy.

3. The computer implemented method of claim 1, wherein:
    said step of grouping input and gated clocks within the circuit design includes
        inspected to see which inputs are at frequency/voltage domain top level, for each of such input grouping an entire combinational cloud from the module input to a corresponding connection at the newly created hierarchy, and adding all clock gates in the circuit which control registers controlled by a first frequency to the hierarchy.

4. The computer implemented method of claim 1, wherein:
said step of identifying cells for duplication in the circuit design further includes listing all top level output ports, creating a collection endpoints of all outputs of a hierarchy, filtering out ports from this collection which are directly connected to top level output ports, checking other pins in the fanout of each driving pin, if the driving pin is driving a top level output port, then stopping processing that endpoint, if the driving pin is a sequential cell (an aclk flip-flop), then stopping processing at that endpoint, and if the driving cell is a combinational cell, then identifying the cell for duplication.

5. The computer implemented method of claim 1, wherein:
said step of creating new connections within a new hierarchy includes determining all input ports of said duplicated cells which are not input ports of another hierarchy, connecting each input port of each duplicated cell not an input port of another hierarchy to a corresponding input port of a corresponding original cell, determining all output ports of said duplicated cells which are output ports of another hierarchy, and for each output port of each duplicated cell an output port of another hierarchy disconnecting said output port of a corresponding original cell and connecting said output port of said duplicated cell.

6. The computer implemented method of claim 1, wherein:
said step of removing redundant logic elements includes comparing ports of the original circuit design with ports of the duplicated registers, inputs and gated clocks, preparing a list of input ports of the registers, inputs and gated clocks which are not ports of the original circuit design, creating new input ports for these inputs, making connections from input ports of the original circuit design to each corresponding new input port, preparing a list of output ports of the registers, inputs and gated clocks which are not ports of the original circuit design, creating new output ports for these inputs, making connections from output ports of the original circuit design to each corresponding new output port.

7. The computer implemented method of claim 1, wherein:
said step of inserting level shifters and isolation cells in boundaries between frequency/voltage domains includes inserting level shifters or isolation cells at the interface of the original circuit design boundary of a first frequency/voltage domain driving into a second frequency/voltage domain.

8. The computer implemented method of claim 1, further comprising the step of:

checking the level shifters and isolation cells includes timing checks, and circuit checks.

* * * * *